March 11, 1947.  J. H. NORMAN  2,417,172
CAKE CUTTER AND SERVER
Filed March 8, 1945
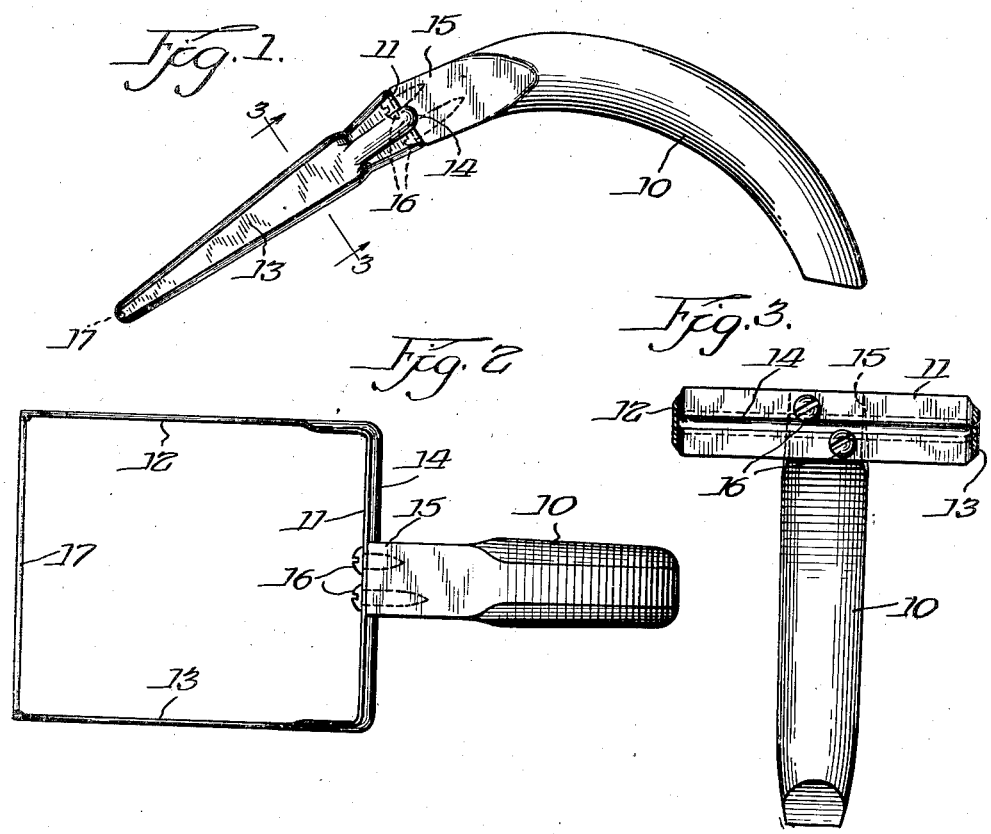
Inventor:
John H. Norman
By Wilkinson Huxley Byron & Knight
Attys.

Patented Mar. 11, 1947

2,417,172

UNITED STATES PATENT OFFICE 2,417,172

CAKE CUTTER AND SERVER

John H. Norman, Elmhurst, Ill.

Application March 8, 1945, Serial No. 581,591

3 Claims. (Cl. 30—115)

My invention relates to a combined cake cutter and server and has particular reference to a cutting and serving device for use in cutting and removing cake which preferably has been baked in square or rectangular shaped pans and which is cut into pieces usually in the form of squares before being served while in the pan in which it was baked.

Another and further object of my invention is the provision of a combined cutter and serving device which has a plurality of spaced cutting knives thereon so that in cutting a cake into pieces while the knife is held in the hand of the operator one of the blades of the knife follows the line of a cut previously made and thus serves as a gauge for determining the width of the pieces of cake to be cut and also serves to re-cut cake so that the pieces are certain to be severed and are easily removed from the pan.

Another and further object of my invention is the provision of a combined cake cutter and server which also loosens the cake from the bottom of the pan or from the paper on which the cake is baked, as well as cutting the cake, if the pan has been lined with paper prior to the placing therein of the cake material to be baked, so that the pieces are easily and quickly removed from the pan and easily served.

Another and further object of my invention is the provision of a cake cutter in which cake can be severed into squares by cutting the cake in two directions at right angles to each other and in which the pieces of cake are evenly cut and regular in form and present an attractive appearance when served, particularly because the cake is completely severed and loosened from the pan and easily removed without being broken, representing an unsightly appearance.

These and other objects of my invention will be more fully and better understood by reference to the accompanying sheet of drawings and in which—

Figure 1 is a side elevational view of the preferred form of my improved device;

Figure 2 is a top plan view of the device shown in Fig. 1;

Figure 3 is a sectional view of the preferred form of my combined cake knife and server on lines 3—3 of Fig. 1.

Referring now specifically to the drawing and in which like reference characters refer to like parts throughout, a handle 10 is shown which is preferably curved in arcuate form to allow the operator to secure a better grip on the handle with relation to the angle of the knife portion of the device in cutting a cake and which, when the position of the device is reversed, places the knife portion in substantially a horizontal position to enable the user to better remove the pieces of cake from the pan for placing upon an appropriate dish for serving.

The knife in the preferred form of the invention consists of a body portion 11 and cutting portions 12 and 13 which are bent at right angles to the body portion 11 and are hence parallel with respect to each other. The body portion 11 has a rib 14 formed thereon which is fitted into a recess 15 in the end of the handle 10 with the body portion being secured to the handle portion 10 by means of screws 16, 16. The rib 14 extends throughout the length of the body member 11 and is turned at right angles around the corners of the body member 11 and merges into spaced blade portions 12 and 13 which are sharpened on both sides so that they will cut in a plurality of directions. A connecting member 17 in the form of a wire or blade is soldered to the free ends of the blade portions 12 and 13 and when the device is used for cutting, the member 17 passes along the bottom of the pan beneath the cake and loosens the cake from the bottom of the pan so that it can be easily picked up and served without breaking the squares into pieces and rendering them unsightly.

The operation of the device will be easily understood in that when it is desired to cut a cake into squares the knives of either one of the forms is inserted adjacent one side of the pan and drawn across the cake with one of the blades passing between the cake and the edge of the baking pan. In the case of the preferred form of the device the connecting member passes under the strip of cake and loosens it from the bottom and, with the next cut, one of the blades follows the line of cut made initially by the blade farthermost removed from the edge of the pan, another cut is made and the operation is repeated until in effect the cake is cut into a series of strips. The cake is then cut in the opposite direction in the same manner with the result that the squares are formed and then when it is desired to serve, the device is turned over so that the connecting member can be slipped under the cake and the end slightly cornerwise if desired and the pieces of cake lifted out of the container and placed upon a proper dish or plate for serving. The spacing of the blades can be fixed at any desired distance, although this spacing should be somewhat in relation to the size of the pan used in baking, which in the present instance is approximately 2¼ inches.

While I have described more or less precisely the details of construction, I do not wish to be understood as limiting myself thereto, as I contemplate changes in form and the proportion of parts and the substitution of equivalents as circumstances may suggest or render expedient without departing from the spirit or scope of the appended claims.

I claim:

1. A combined cake cutter and server comprising in combination a handle, a knife having a body portion and blade portions at right angles to the body portion, means whereby the body portion of the knife is secured to the handle and a wire cutting member attached to the extremities of the free ends of the blade portions of the knife and spanning the space between the said blade portions.

2. A combined cake cutter and server comprising in combination a handle, a knife having a body portion and blade portions at right angles to the body portion, means whereby the body portion of the knife is secured to the handle and a wire cutting member attached to the blade extremities of the free ends of the portions of the knife and spanning the space between the said blade portions the handle being at a substantial angle from the plane of the blade portions.

3. A combined cutter and server comprising in combination a handle, a knife comprising spaced substantially parallel blades, means operatively connecting one end of each of said blades to said handle, and a wire cutting member attached to said blades at the extremities of the other ends thereof and spanning the space therebetween.

JOHN H. NORMAN.

REFERENCES CITED

The following references are of record in the file of this patent:

UNITED STATES PATENTS

| Number | Name | Date |
|--------|------|------|
| 608,337 | Merkle | Aug. 2, 1898 |

Certificate of Correction

Patent No. 2,417,172.  March 11, 1947.

JOHN H. NORMAN

It is hereby certified that error appears in the printed specification of the above numbered patent requiring correction as follows: Column 4, line 2, claim 2, strike out the word "blade" and insert the same before "portions" line 3, same column; and that the said Letters Patent should be read with this correction therein that the same may conform to the record of the case in the Patent Office.

Signed and sealed this 13th day of May, A. D. 1947.

[SEAL]

LESLIE FRAZER,
*First Assistant Commissioner of Patents.*